United States Patent [19]

Okamoto et al.

[11] Patent Number: 5,119,458
[45] Date of Patent: Jun. 2, 1992

[54] FIBRE-TYPE WAVELENGTH CONVERISON DEVICE

[75] Inventors: Sota Okamoto, Saitama; Takafumi Uemiya, Osaka; Kiyofumi Chikuma, Saitama, all of Japan

[73] Assignees: Pioneer Electronic Corporation, Tokyo; Sumitomo Electric Industries, Ltd., Osaka, both of Japan

[21] Appl. No.: 355,004

[22] Filed: May 19, 1989

[30] Foreign Application Priority Data

May 20, 1988 [JP] Japan .................. 63-123413

[51] Int. Cl.$^5$ .............................. G02F 1/37
[52] U.S. Cl. .................. 385/122; 359/328; 359/332
[58] Field of Search .............. 307/425, 430; 350/96.15, 96.18, 96.19, 96.29, 96.30; 359/326–332; 385/122

[56] References Cited

U.S. PATENT DOCUMENTS

| 3,617,109 | 11/1971 | Tien | 350/96.15 |
|---|---|---|---|
| 4,125,768 | 11/1978 | Jackson et al. | 350/96.19 X |
| 4,756,598 | 7/1988 | Gerbi et al. | 350/96.29 |
| 4,830,447 | 5/1989 | Kamiyama et al. | 307/425 X |
| 4,874,221 | 10/1989 | Ohsawa | 350/96.29 |

FOREIGN PATENT DOCUMENTS

| 57-89713 | 6/1982 | Japan | 350/96.29 |
|---|---|---|---|
| 61-50122 | 3/1986 | Japan . | |

Primary Examiner—John D. Lee
Attorney, Agent, or Firm—Fleit, Jacobson, Cohn, Price, Holman & Stern

[57] ABSTRACT

A fibre-type light conversion device for converting the wavelength of an incident light comprises a core and a cladding layer provided around the core. An end surface of the device from which the light beam radiates is made conical, so that the second harmonic wave is collimated without using any additional optical element such as a conical prism. The end surface of the device is formed by a process in which the end surface of the device is polished with a central axis of the device being held at a predetermined angle with respect to a polishing surface while the device is rotated about the central axis.

5 Claims, 2 Drawing Sheets

FIBRE-TYPE WAVELENGTH CONVERISON DEVICE

BACKGROUND OF THE INVENTION

1. Field of the Invention

The present invention relates to a fiber-type light wavelength conversion device.

2. Description of Background Information

An optical pickup is known by which high density writing and reading of information on and from a disc are enabled by converting the wavelength of a laser beam emitted from a laser source to a half the original wavelength by means of a light wavelength conversion device (or optical frequency doubler). Reference is directed to Japanese Patent Application Laid-Open No. 61-0122.

As the light wavelength conversion device for use in this type of pickup, there is an optical fiber-type SHG (Second Harmonics Generator) using a second-order non-linear optical effect. A phase matching of Cerenkov radiation system is adopted in the optical fiber-type SHG. With this system, it is possible to generate a second harmonic wave (referred to as SH wave hereinafter) whose phase matching is attained almost automatically. The general concept of this device is shown in FIGS. 1A and 1B.

In FIG. 1A, when the fundamental wave mode is propagated through the core with the effective reflective index of $N(\omega)$, the non-linear polarizing wave generating the SH wave is also propagated at the same phase velocity $C/N(\omega)$ (C is the speed of light). It is assumed that this non-linear polarizing wave produces the SH wave in a direction making an angle $\theta$ with respect to the direction of the wave guide at a point A, and generates the SH wave in the direction of $\theta$ as before at a point B, after the elapse of a unit time. If the SH wave generated at the point A propagates through the clad and reaches to a point C after the elapse of the unit time and the angle $\theta$ is such an angle that lines AC and BC are perpendicular to each other, then the wave front of the SH wave which is generated from the non-linear polarized wave between A and B becomes equal to BC, and as a result, a coherent SH wave is generated.

The condition of the phase matching is, according to the figure, as follows:

$$N(\omega) = N_{clad}(2\omega) \cos\theta \quad (1)$$

where $N_{clad}(2\omega)$ is the refractive index of the clad for the SH wave.

This in turn gives, $$N(\omega) < N_{clad}(2\omega) \quad (2)$$

The above equation means that the SH is generated automatically in the direction where the phase matching is performed when at least the condition mentioned by the equation (2) is satisfied. Generally, with the refractive indices of the clad and core for the fundamental wave being $n_{clad}(\omega)$ and $n(\omega)$ and with air as the overlayer, the condition for the fundamental wave to propagate through the core as a mode is expressed as follows:

$$N_{clad}(\omega) < N(\omega) < n(\omega) \quad (3)$$

Wavelength dispersion of the clad's refractive index will now be considered. Since $n_{clad}(\omega) < n_{clad}(2\omega)$, the equation (2) is satisfied for all of the fundamental wave modes irrespectively of the diameter of the core so far as the following expression (4) is satisfied.

$$N_{clad}(\omega) < N(\omega) < n_{clad}(2\omega) \quad (4)$$

Moreover, there are fundamental modes satisfying the equation (2) in a certain range of the diameter of the core even under the following condition.

$$N_{clad}(\omega) < n_{clad}(2\omega) < n(\omega)$$

The second harmonic wave generated in this way is propagated in a clad mode as illustrated in FIG. 1B in which total reflection occurs repeatedly at the boundary between the clad and air. Then, the second harmonic wave is emitted in conical shape from the end of fiber in directions making an angle $\theta$ relative to the fiber's direction. The equiphase front of the second harmonic wave emitted in this way is in a conical surface with an axis on the central axis of the fiber.

In order to efficiently apply this second harmonic wave in the opto-electronics, it is desirable to give the emitted wave surface a plane form. As illustrated in FIG. 2, it is conceivable to dispose a conical prism 20 with a conical surface in the optical path of the beam emitted from the wavelength conversion device 10. The conical equiphase front can be converted to a planer equiphase front by collimating the second harmonic wave (making it parallel) by means of the function of the conical prism 20.

However, in such a structure for collimating the second harmonic wave the optical structure becomes complicated by the provision of the conical prism or the like in the optical path. Furthermore, it is also necessary to effect positional adjustment of such optical elements. Thus, there has been a drawback of increase in cost of the light wavelength conversion device.

OBJECT AND SUMMARY OF THE INVENTION

The present invention has been made in view of the above-described point, and an object of the present invention is to provide a fiber-type light conversion device which is configured to collimate the second harmonic wave without using any separate optical part.

The fiber-type light wavelength conversion device according to the present invention has a construction such that an end surface, from which the beam whose wavelength has been converted radiates, is made substantially conical, whereby the second harmonic wave is collimated by the conical end surface.

DETAILED DESCRIPTION OF THE PREFERRED EMBODIMENT

The preferred embodiment of the present invention will be explained with reference to the accompanying drawings hereinafter.

Figure 1A:
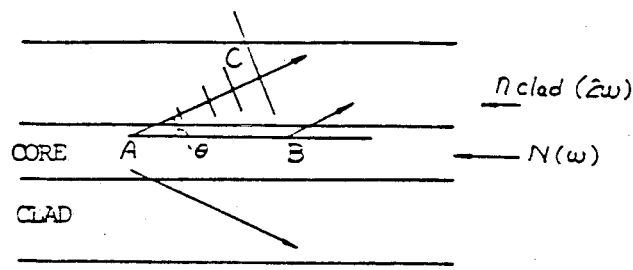
FIGS. 1A and 1B are diagrams for explaining the concept of the Cerenkov radiation system phase matching SHG.
Figure 1B:
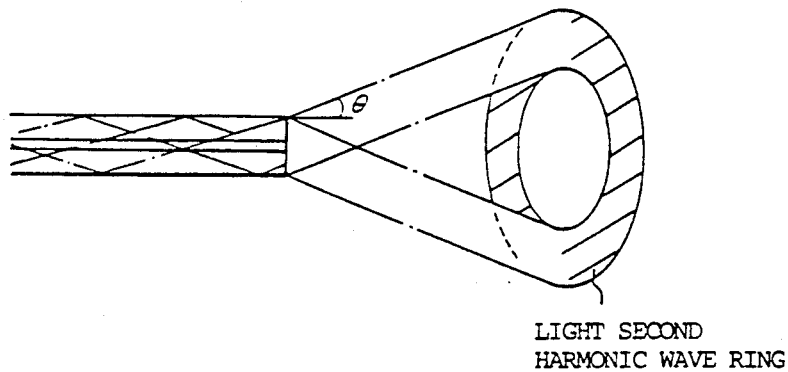
Figure 2:
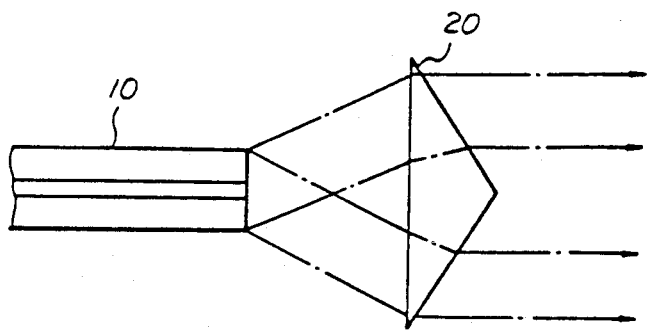
FIG. 2 is a diagram for explaining the concept of collimating the second harmonic wave by means of a conical prism.
Figure 3:
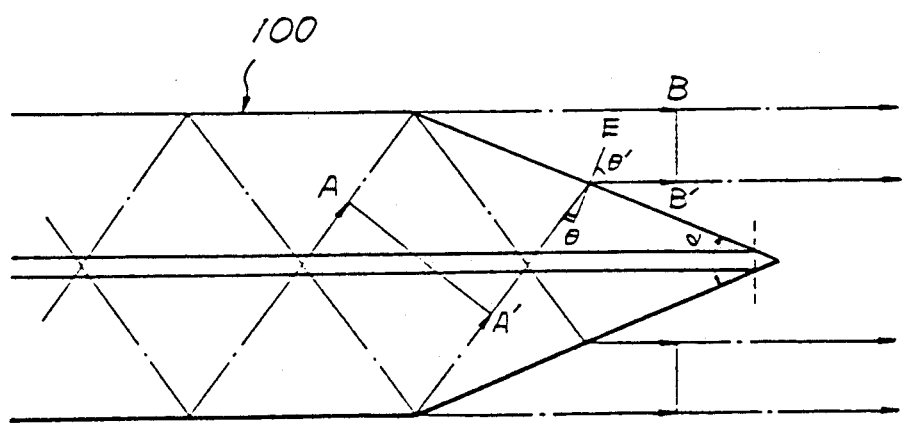
FIG. 3 is a diagram showing an embodiment of the fiber-type light wavelength conversion device according to the present invention, especially showing a cross sectional view of an end surface thereof from which the beam radiates.
Figure 4:
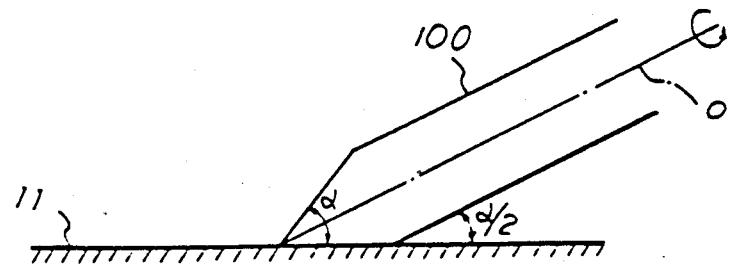
FIG. 4 is a diagram showing the manner of processing the beam radiation end surface.

In FIG. 3, a fiber-type light wavelength conversion device according to the present invention which is generally indicated by 100 has an end surface having a conical form, from which the beam radiates. The processing of this conical end surface is performed, for example, as illustrated in FIG. 4. In this process an end of the fiber-type light wavelength conversion device 100 is polished with its central axis O being held at an angle $\alpha/2$ with respect to a polishing surface 11, while the device 100 is rotated about its central axis O. By this process it is possible to place the center of the cone on the central axis O with ease as well as with high precision.

The function of the conical end surface of the fiber-type light wavelength conversion device according to the present invention will be explained. An equiphase front AA' of the second harmonic wave propagating as a clad mode is incident on the end surface, from which the beam radiates, processed into a conical form.

From the Snell's law, the following condition is satisfied:

$$n_{clad}(2\omega) \sin\theta = n' \sin\theta'$$

where $\theta$ represents the angle of incidence with respect to a normal E of this conical end surface, and $n_{clad}$ represents the refraction index of the clad. Therefore, second harmonic wave radiates from the conical surface at an angle $\theta'$ relative to the normal E. In the above equation, n' represents the refractive index of the outside of the fiber, and it generally is air (n'=1).

This follows that equiphase surface of the radiating second harmonic wave will be rendered flat as a plane BB' if the apical angle $\alpha$ of the conical end surface is determined to satisfy the following equation.

$$\alpha = 180° - 2\theta'$$

With this feature, the second harmonic wave radiates in the form of a parallel light.

In the embodiment described above, the end surface from which the beam radiates is given a conical form. However, it is also possible to remove the tip, or the apex, from the cone as indicated by the dashed line in FIG. 3. Also in this arrangement, substantially the same function as the embodiment described above can be attained by the end surface formed in such a way.

As described in the foregoing, the fiber-type light wavelength conversion device according to the present invention is configured that the end surface from which the beam radiates is made conical, and the second harmonic wave is collimated by the function of the conical end surface. Hence, a separate optical part such as the conical prism is no more required and the second harmonic wave is collimated by the wavelength conversion device itself which is prepared by an easy and low-cost process, i.e. processing the end surface, from which the beam radiates, into a conical form.

What is claimed is:

1. An optical wavelength converter device comprising an optical fiber having proximal and distal ends including:
    i) a cladding having a first refractive index;
    ii) a core of a nonlinear optical material disposed in said cladding and having a second refractive index higher than said first refractive index, whereby said optical fiber converts the wavelength of a fundamental wave introduced into said core at said proximal end and radiates a wavelength-converted wave into said cladding; and
    iii) said cladding emits the wavelength-converted wave at said distal end, said distal end of said optical fiber being symmetrically tapered to a conical shape for converting the wavefront of said wavelength-converted wave into a planar wavefront.

2. In an optical wavelength conversion device comprised of an optical fiber having proximal and distal ends and comprising an elongated cylindrical core of a nonlinear optical material, and a cladding layer having a refractive index lower than the refractive index of said nonlinear optical material of said core and covering said core to convert a fundamental wave entering said optical fiber at said proximal end to a second harmonic of said fundamental wave and to radiate the second harmonic at said distal end of said fiber, the improvement comprising said distal end of said fiber being symmetrically tapered to a conical shape so that the wave front of said second harmonic emitted from said fiber at said distal end is planar.

3. The optical wavelength conversion device of claim 2, wherein said distal end of said fiber terminates in a sharp tip.

4. The optical wavelength conversion device of claim 2, wherein the distal end of said fiber terminates in a blunt tip.

5. A process for making an optical wavelength conversion device comprising the steps of:
    forming an optical fiber having proximal and distal ends and comprising an elongated cylindrical core of a nonlinear optical material;
    covering said core with a cladding layer having a refractive index lower than the refractive index of said nonlinear optical material of said core to convert a fundamental wave entering said optical fiber at said proximal end to a second harmonic of siad fundamental wave and to radiate the second harmonic of said distal end of said fiber;
    polishing the distal end of said fiber about a central axis of said fiber while maintaining said fiber at a predetermined angle with respect to a polishing surface at the distal end of the fiber; and
    rotating the fiber about said central axis and symmetrically tapering the distal end of said fiber to a conical shape so that the wavefront of said second harmonic emitted from the distal end of said fiber is planar.

* * * * *